(12) United States Patent
Park et al.

(10) Patent No.: US 7,947,409 B2
(45) Date of Patent: May 24, 2011

(54) METALLIC SEPARATOR FOR FUEL CELL AND FUEL CELL INCLUDING THE SAME

(75) Inventors: Jung-ock Park, Yongin-si (KR); Tae-young Kim, Seoul (KR); Kyoo-young Kim, Pohang-si (KR); Duck-young Yoo, Seoul (KR)

(73) Assignee: Samsung SDI Co., Ltd., Suwon (KR)

( * ) Notice: Subject to any disclaimer, the term of this patent is extended or adjusted under 35 U.S.C. 154(b) by 1145 days.

(21) Appl. No.: 11/304,895

(22) Filed: Dec. 16, 2005

(65) Prior Publication Data

US 2006/0141333 A1  Jun. 29, 2006

(30) Foreign Application Priority Data

Dec. 22, 2004 (KR) .................. 10-2004-0110175

(51) Int. Cl.
*H01M 4/66* (2006.01)
*H01M 4/64* (2006.01)

(52) U.S. Cl. ......... 429/522; 429/517; 429/518; 429/519

(58) Field of Classification Search .................. 429/138, 429/38, 129
See application file for complete search history.

(56) References Cited

U.S. PATENT DOCUMENTS

| | | | | |
|---|---|---|---|---|
| 3,551,142 A | * | 12/1970 | Decroix | 420/45 |
| 6,045,934 A | * | 4/2000 | Enami | 429/30 |
| 6,379,476 B1 | * | 4/2002 | Tarutani et al. | 148/325 |
| 6,749,959 B2 | * | 6/2004 | Nakata et al. | 429/34 |
| 2003/0170526 A1 | * | 9/2003 | Hodgson et al. | 429/34 |

FOREIGN PATENT DOCUMENTS

| JP | 2-752101 | 2/1998 |
|---|---|---|
| JP | 11-162479 | 6/1999 |
| JP | 2001-032056 | 2/2001 |
| JP | 3-498077 | 11/2003 |

OTHER PUBLICATIONS

Korean Registration Determination Certificate dated Jan. 4, 2011 on KR Application No. 10-2004-0110175, which corresponds to U.S. Appl. No. 11/304,895.

* cited by examiner

*Primary Examiner* — Dah-Wei D Yuan
*Assistant Examiner* — Kwang Han
(74) *Attorney, Agent, or Firm* — H.C. Park & Associates, PLC

(57) ABSTRACT

A separator for a fuel cell includes a first layer that includes stainless steel and tungsten and a second layer that includes stainless steel and tungsten. The first layer contains more tungsten than the second layer so that the separator has anti-corrosion properties specifically tailored to the environment of the anode and the cathode.

18 Claims, 8 Drawing Sheets

METALLIC SEPARATOR FOR FUEL CELL AND FUEL CELL INCLUDING THE SAME

CROSS REFERENCE TO RELATED PATENT APPLICATIONS

This application claims priority to and the benefit of Korean Patent Application No. 10-2004-0110175, filed on Dec. 22, 2004, which is hereby incorporated by reference for all purposes as if fully set forth herein.

BACKGROUND OF THE INVENTION

1. Field of the Invention

The present invention relates to a separator for a fuel cell, and more particularly, to a separator for a fuel cell made of stainless steel, tungsten (W) and/or Molybdenum (Mo).

2. Description of the Related Art

Fuel cells produce electrical energy through the electrochemical reaction of fuel with oxygen. The operating mechanism of a fuel cell begins by oxidizing a fuel, such as hydrogen, natural gas, or methanol at an anode in the fuel cell to produce an electron and a hydrogen ion. The hydrogen ion produced at the anode passes through an electrolyte membrane to a cathode, and the electron produced at the anode is supplied to an external circuit through a wire and then is returned back to the cathode. The hydrogen ion combines with the electron and oxygen from the air at the cathode to form water.

Fuel cells may be classified as polymer electrolyte membrane fuel cells (PEMFCs), phosphoric acid fuel cells (PAFCs), molten carbonate fuel cells (MCFCs), or solid oxide fuel cells (SOFCs) according to the type of electrolyte used. Operating temperatures and the materials used in the elements of the fuel cell vary depending on the type of fuel cell.

PEMFCs may be operated at relatively low operating temperatures, such as about 80° C. to about 120° C., and have a very high current density. PEMFCs can thus be used as a power supply for vehicles and homes.

PEMFCs may include a bipolar plate and a membrane electrode assembly (MEA). The MEA includes an anode in which the fuel is oxidized, a cathode in which an oxidizing agent is reduced, and an electrolyte membrane interposed between the anode and the cathode. The electrolyte membrane should have an ion conductivity sufficient to deliver a hydrogen ion from the anode to the cathode. The electrolyte membrane also serves to insulate the anode from the cathode.

The bipolar plate may include channels through which fuel and air flow. The bipolar plate also functions as an electron conductor for transporting electrons between MEAs. The bipolar plate should be non-porous to keep the fuel and the air separated, and should have excellent electrical conductivity and sufficient thermal conductivity to control the temperature of the fuel cell. Furthermore, the bipolar plate should have a mechanical strength sufficient to bear a force clamping the fuel cell together and should be corrosion resistant in the presence of hydrogen ions.

In the past, PEMFC bipolar plates were usually made of graphite, and the fuel and air channels were usually formed by milling. Graphite plates generally have sufficient electrical conductivity and resistance to corrosion. However, graphite plates and the milling process are very expensive. Furthermore, graphite plates are brittle, and it is therefore difficult to process graphite bipolar plates less than 2 to 3 mm thick. Due to the thickness of the graphite bipolar plates, the fuel cell stacks cannot be made sufficiently thin, especially when the fuel cell stacks include several hundred unit cells.

To reduce production costs and the thickness of the bipolar plates, attempts have been made to produce a bipolar plate made of metal. Metals have most of the physical properties required for the bipolar plates and raw material and processing costs for metals are relatively low.

However, metallic bipolar plates may corrode under acidic conditions inside a fuel cell, and an oxidized film may form, which may result in membrane poisoning and increased contact resistance. Corrosion of the metallic bipolar plate may also poison the catalyst and the electrolyte due to the diffusion of metal ions into the electrolyte membrane. Poisoning decreases the activity of the catalyst and reduces the proton conductivity of the electrolyte, which results in the deterioration of the performance of the fuel cell. In addition, as corroded metal is removed from the metallic bipolar plate, the contact between the separator and the MEA deteriorates and increases electrical conductivity resistance, which degrades the performance of the fuel cell.

Attempts have been made to coat metallic bipolar plates with materials that have anti-corrosive properties and good electrical conductivity. Korean Laid-Open Patent Publication No. 2003-0053406 describes coating a bipolar plate composed of Ti or stainless steel with a TiN alloy. However, in a 1,000-hour performance test, a PEMFC including a bipolar plate made of stainless steel, a Ti alloy, or an Ni alloy does not perform as well as a PEMFC including a graphite bipolar plate.

SUMMARY OF THE INVENTION

This invention provides a metallic separator for a fuel cell having improved corrosion resistance and a fuel cell including the separator.

Additional features of the invention will be set forth in the description which follows, and in part will be apparent from the description, or may be learned by practice of the invention.

The present invention discloses a separator for a fuel cell, including a first layer forming a first side of the separator, wherein the first layer comprises stainless steel and W; and a second layer forming a second side of the separator, wherein the second layer comprises stainless steel and W, and wherein the first layer contains more W than the second layer. The present invention also discloses a fuel cell including the separator described above.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
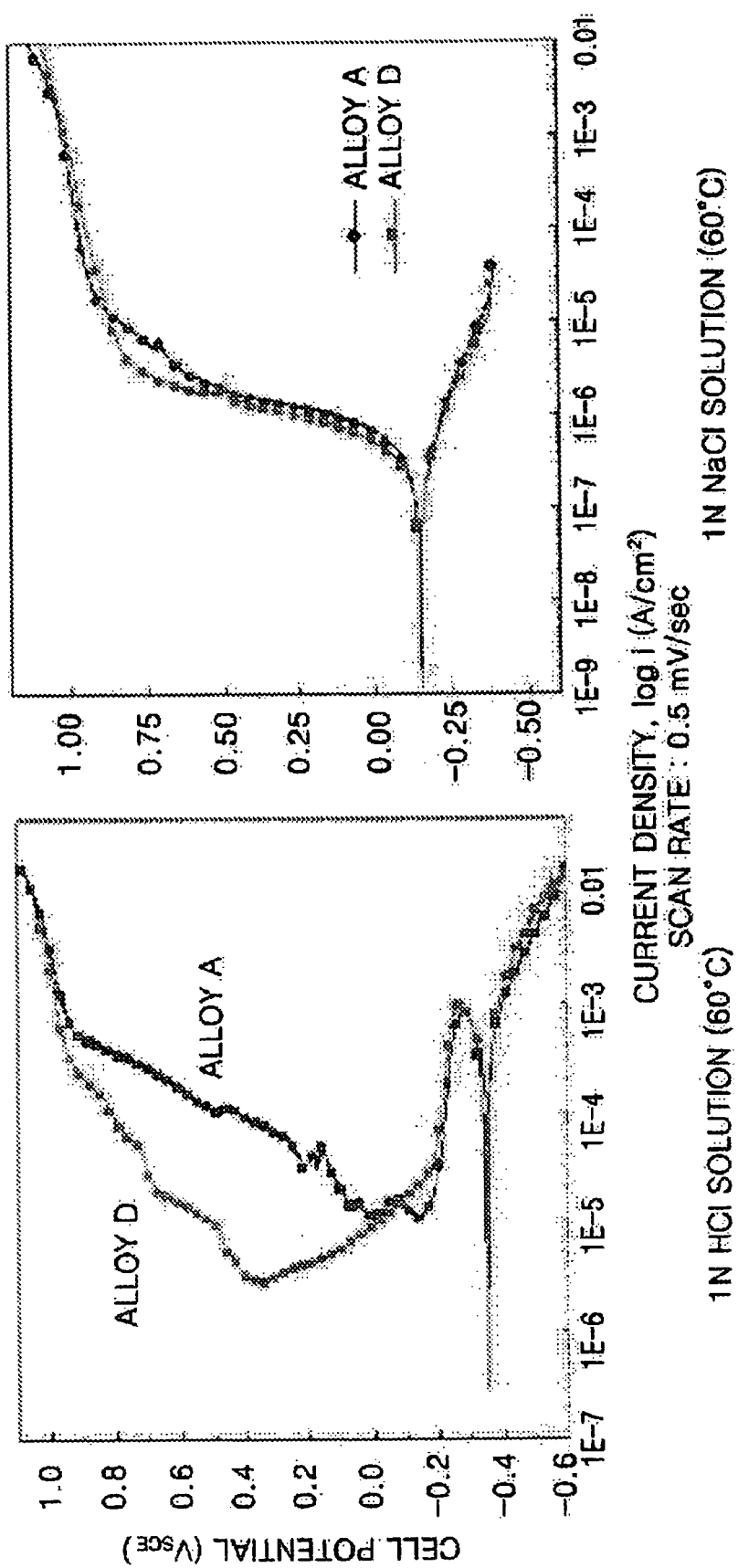
FIG. 1 is a graph showing results of corrosion resistance tests for alloy A and alloy D in the presence of a hydrogen ion.
Figure 2A:
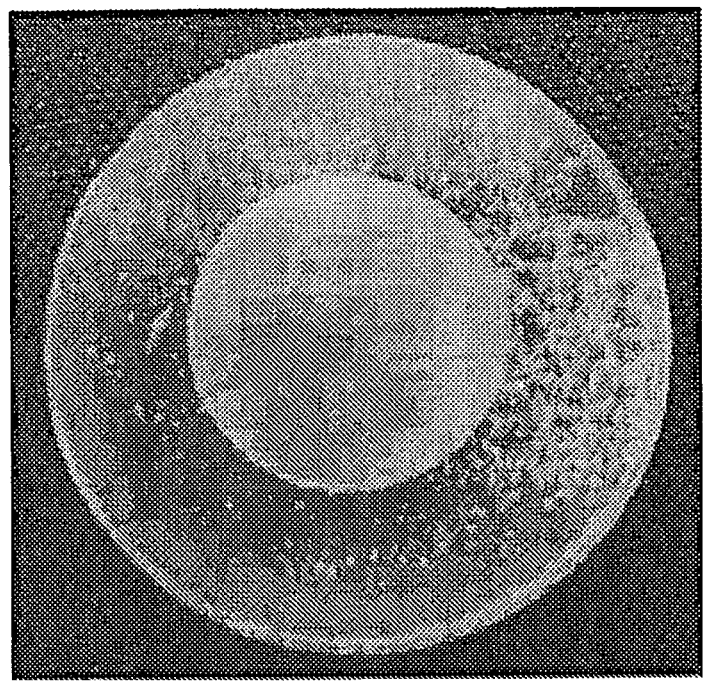
FIG. 2A, FIG. 2B, FIG. 2C, and FIG. 2D are photo images of the test results of Example 1, Example 2, Example 3, and Example 4, respectively.
Figure 2B:
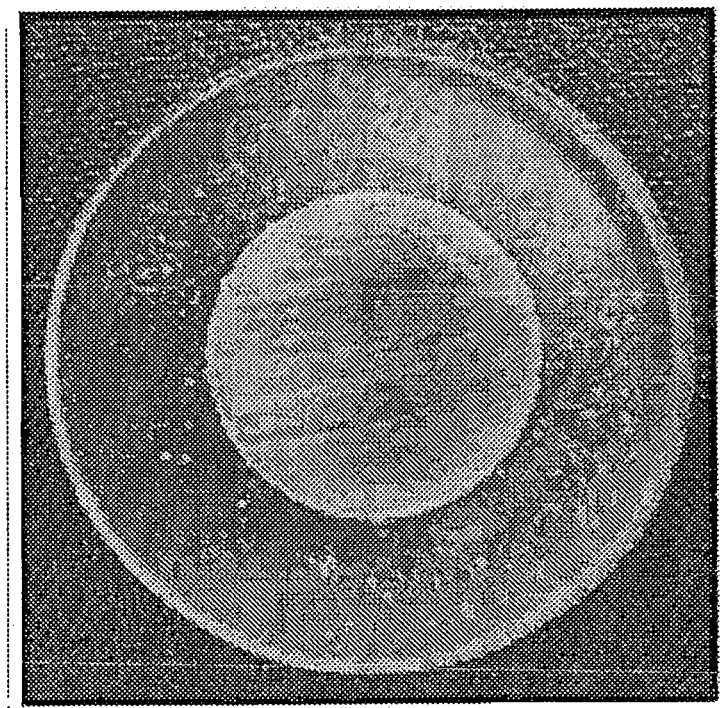
Figure 2C:
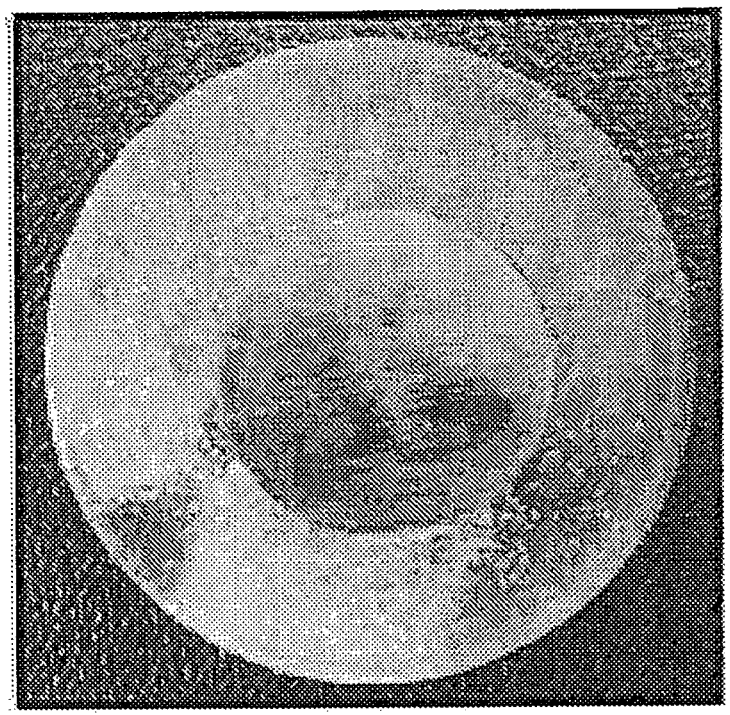
Figure 2D:
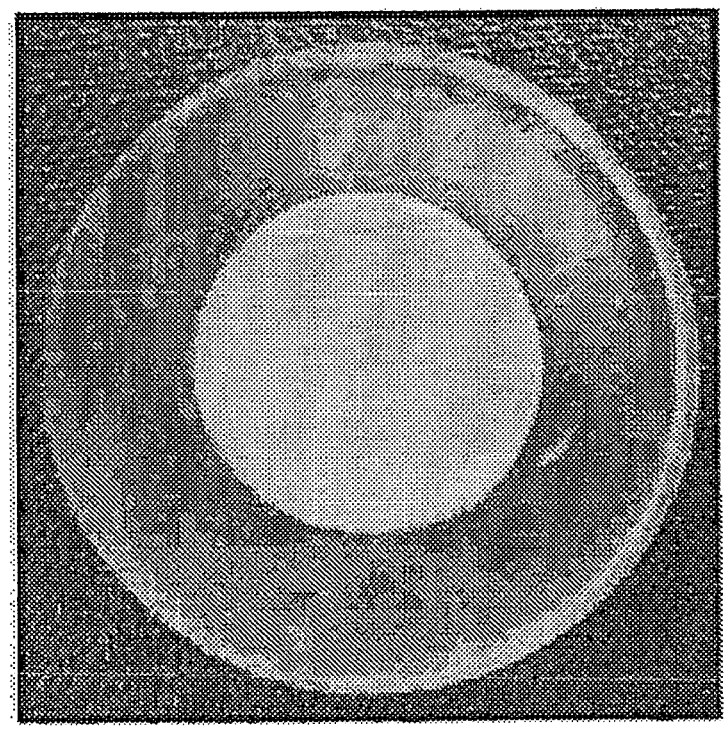

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

It will be understood that when an element such as a layer, film, region or substrate is referred to as being "on" another element, it can be directly on the other element or intervening elements may also be present. In contrast, when an element is referred to as being "directly on" another element, there are no intervening elements present. In the present invention, the term "separator" has a broad meaning that comprehensively includes a bipolar plate as described above, an end plate, and a cooling plate.

A separator for a fuel cell according to an embodiment of the present invention is formed of a stainless steel containing Cr, Ni, and Fe. The separator further includes W to increase corrosion resistance. One layer, which forms a side of the separator, and another layer, which forms the other side of the separator, may have different amounts of W. The amount of W of in one layer may be greater than the amount of W in the other layer.

The two sides of a separator may be subject to different corrosive environments, such as when one side of the separator faces a cathode and the other side of the separator faces an anode. The corrosion occurring at the anode may have different characteristics than the corrosion occurring at the cathode. Therefore, the two sides of the separator may have different characteristics to increase the separator's corrosion resistance.

The total amount of W in the separator may be in the range of about 0.01 to about 15 parts by weight per 100 parts by weight of the stainless steel. The amount of W in the first layer may be about 0.01 to about 15 parts by weight per 100 parts by weight of the stainless steel, and preferably, about 1 to about 9 parts by weight per 100 parts by weight of the stainless steel. The amount of W in the second layer may be about 0.01 to about 6 parts by weight per 100 parts by weight of the stainless steel, and preferably, about 0.5 to about 4.5 parts by weight per 100 parts by weight of the stainless steel.

When the amount of W in the separator is less than about 0.01 parts by weight per 100 parts by weight of the stainless steel, the separator may not have enough resistance to corrosion by acid. When the amount of W of the separator exceeds about 15 parts by weight per 100 parts by weight of the stainless steel, the corrosion resistance of the separator may not be further improved, and manufacturing costs are increased unnecessarily. For example, increasing the amount of W in a layer forming a side of the separator facing a cathode to levels greater than 6 parts by weight per 100 parts by weight of the stainless steel provides only a small increase in corrosion resistance.

It is theorized that a separator for a fuel cell that contains W has a high corrosion resistance because W has high corrosion resistance properties. It was confirmed that under the acidic conditions of a hydrogen atmosphere, a stainless steel alloy that contains W has better corrosion resistance than a stainless steel alloy that does not contain W.

The stainless steel may contain about 13 to about 30 parts by weight of Cr per 100 parts by weight of the stainless steel, about 5 to about 30 parts by weight of Ni per 100 parts by weight of the stainless steel, and about 40 to about 80 parts by weight of Fe per 100 parts by weight of the stainless steel. When the amount of Cr is less than about 13 parts by weight per 100 parts by weight of the stainless steel, a stable immobile film of the stainless steel may not be formed, and the stainless steel may not have sufficient corrosion resistance. When the amount of Cr is greater than about 30 parts by weight per 100 parts by weight of the stainless steel, processing is difficult. Ni is used as an austenite stabilizer, and when the amount of Ni increases, the proportion of austenite existing in the stainless steel increases. When the amount of Ni is less than about 5 parts by weight per 100 parts by weight of the stainless steel, a ferrite stainless steel is produced instead of austenite. When the amount of Ni used increases, resistance against local corrosion increases. However, when the amount of Ni is greater than about 30 parts by weight per 100 parts by weight of the stainless steel, the manufacturing costs are increased excessively because Ni is relatively expensive. The amount of Fe may vary according to the amounts of Cr and Ni used.

The second layer may further contain about 0.2 to about 5 parts by weight of Mo per 100 parts by weight of the stainless steel, and preferably, about 1 to about 4 parts by weight of Mo per 100 parts by weight of the stainless steel. It has been confirmed that when Mo is added to stainless steel containing W, the corrosion resistance of the stainless steel substantially increases in an oxygen atmosphere. When the amount of Mo is less than about 0.2 parts by weight per 100 parts by weight of the stainless steel, the corrosion resistance of the stainless steel in an oxygen atmosphere is low. When the amount of Mo is greater than about 5 parts by weight per 100 parts by weight of the stainless steel, precipitation of a secondary phase (sigma phase and/or chi phase) is facilitated. The secondary phase has an adverse effect on the corrosion resistance and mechanical properties of the stainless steel.

The relationship between the separator and the anode and cathode of a fuel cell in which the separator is installed will now be described in detail.

The anode side of the separator may have a low pH level due to hydrogen and an acidic material from a membrane electrode assembly (MEA). The use of stainless steel containing W is thus desirable because, as described above, stainless steel containing W is effective for use in a corrosive hydrogen atmosphere.

The cathode side of the separator, in which oxygen is reduced, has the corrosion conditions of an oxygen atmosphere. The use of W in stainless steel contributes significantly to the corrosion resistance in this environment. However, as described above, the increase in corrosion resistance when the amount of W is increased to more than 6 parts by weight per 100 parts by weight of the stainless steel is small.

Pitting corrosion in particular may easily occur in the cathode. Pitting corrosion is a type of a corrosion that produces pits locally in a material. Pitting corrosion results in a hemisphere or cup-shaped pit. The mouth of the pit may be covered with a semi-permeable membrane of corrosion products. Pitting corrosion itself is not desirable, and it may bring about secondary cracking due to fatigue and stress corrosion.

The addition of Mo to the stainless steel may significantly increase the resistance to pitting corrosion. Accordingly, the stainless steel on the cathode side of the separator may contain Mo and W.

Therefore, the first layer of the separator, which faces the anode, may be made of a stainless steel containing about 0.01 to about 15 parts by weight of W per 100 parts by weight of the stainless steel, and the second layer of the separator, which faces the cathode, may be made of a stainless steel containing about 0.01 to about 6 parts by weight of W per 100 parts by weight of the stainless steel and about 0.2 to about 5 parts by weight of Mo per 100 parts by weight of the stainless steel.

A separator should have excellent electrical conductivity (electrical conductivity>about 10 S/cm), high corrosion resistance against an acidic electrolyte, hydrogen, oxygen, heat, humidity, and the like (corrosion rate<about 16 $\mu A/cm^2$), excellent thermal conductivity (thermal conductivity>about 20 W/mK), and good gas sealing ability (gas sealing<about $10^{-7}$ mbar l/s $cm^2$).

Accordingly, the separator according to an exemplary embodiment of the present invention may have an electrical conductivity of about 10 S/cm or greater. When the electrical conductivity of the separator is less than about 10 S/cm, the efficiency of the fuel cell decreases. The separator may have a current density due to corrosion of less than about 16 $\mu A/cm^2$. A current density due to corrosion greater than about 16 $\mu A/cm^2$ indicates that significant corrosion is occurring and the life of the fuel cell may be reduced.

A method of manufacturing the separator according to an exemplary embodiment of the present invention will now be described.

First, a first layer of stainless steel containing about 0.01 to about 15 parts by weight of W per 100 parts by weight of the stainless steel may be coupled to a second layer of stainless steel containing about 0.01 to about 6 parts by weight of W per 100 parts by weight of the stainless steel using a conventional method. The first layer may contain more W than the second layer. Mo may be coated on the second layer by a physical vapor deposition method, such as vacuum deposition, ion plating, sputtering, and the like, a chemical vapor deposition method (CVD), such as thermal-CVD, light-CVD, plasma-CVD, MO-CVD, and the like, an electrolyte or non-electrolyte plating method, or an alloy forming method.

The second layer may be about 0.1 µm to about 20 µm thick, and preferably, about 1 µm to about 10 µm thick. If the second layer is too thin, it may lack sufficient corrosion resistance. On the other hand, if the second layer is too thick, it may crack.

A metal substrate coated with a Mo layer may be heated to diffuse Mo components at the surface of the second layer into the second layer. The heating temperature may be in the range of about 300° C. to about 900° C., and preferably, about 400° C. to about 800° C., and more preferably, about 600° C. to about 700° C. When the heating temperature is too low, Mo may diffuse to slowly to form a Mo layer with a sufficient concentration. When the heating temperature is too high, an excessive amount of Mo oxide may be formed at the surface, and the surface resistance may increase. A method of directly alloying W and/or Mo without the formation of a coating layer or a surface layer may also be used.

The thickness of the second layer may be about 0.01 to about 99.99% of the total thickness of the separator. When the thickness of the second layer is less than about 0.01% of the thickness of the separator, pitting corrosion of the cathode side may not be prevented. When the thickness of the second layer is greater than about 99.99% of the thickness of the separator, corrosion resistance of the anode side may be reduced, and the manufacturing cost increases due to the high cost of Mo.

Using the above processes, a separator may be produced that includes a first layer including stainless steel containing about 0.01 to about 15 parts by weight of W per 100 parts by weight of the stainless steel, and a second layer including stainless steel containing about 0.01 to about 6 parts by weight of W per 100 parts by weight of the stainless steel and about 0.2 to about 5 parts by weight of Mo per 100 parts by weight of the stainless steel.

In a separator according to another exemplary embodiment of the present invention, the material used to form the substrate of the separator may be Ni, Ti, or the like, instead of the stainless steel. Alternatively, the material for the substrate may be an alloy of Ni, Ti, or stainless steel and at least one metal selected from Al, W, Cu, and the like. The dimensions of the substrate may be determined according to the design of a fuel cell. The substrate may be prepared using a conventional metal processing method.

The separator may be used in a fuel cell, such as a PEMFC, a DMFC, a PAFC, and the like.

The present invention will now be described in further detail with reference to the following examples. These examples are for illustrative purposes only and are not intended to limit the scope of the present invention.

Metal substrates with the compositions shown in Table 1 were tested for corrosion resistance under a corrosive hydrogen atmosphere. The metal substrates were purged using hydrogen in an 85% fume phosphoric acid atmosphere, and left for 5 days at 130° C. The degree of corrosion was determined by visual observation, and the metal substrates were ranked from 1, having the least corrosion, to 7, having the most corrosion. The test results are shown in Table 1.

TABLE 1

|  | Cr (wt %) | Ni (wt %) | Mo (wt %) | W (wt %) | Fe (wt %) | Degree of Corrosion |
|---|---|---|---|---|---|---|
| Example 1 | 18 | 12 | 0 | 4 | 66 | 1 |
| Example 2 | 18 | 12 | 0 | 8 | 62 | 2 |
| Example 3 | 18 | 12 | 2 | 4 | 64 | 4 |
| Example 4 | 18 | 12 | 3 | 2 | 65 | 3 |
| Comparative Example 1 | 18 | 12 | 4 | 0 | 66 | 6 |
| Comparative Example 2 | 18 | 12 | 2 | 0 | 68 | 5 |
| Comparative Example 3 | 18 | 12 | 0 | 0 | 70 | 7 |

Figure 3A:
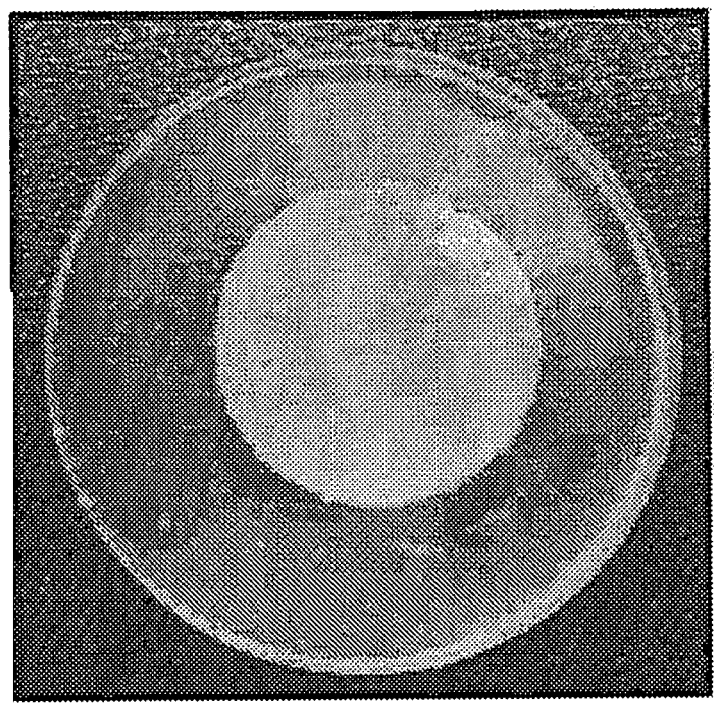
FIG. 3A, FIG. 3B, and FIG. 3C are photo images of the test results of Comparative Example 1, Comparative Example 2, and Comparative Example 3, respectively.
Figure 3B:
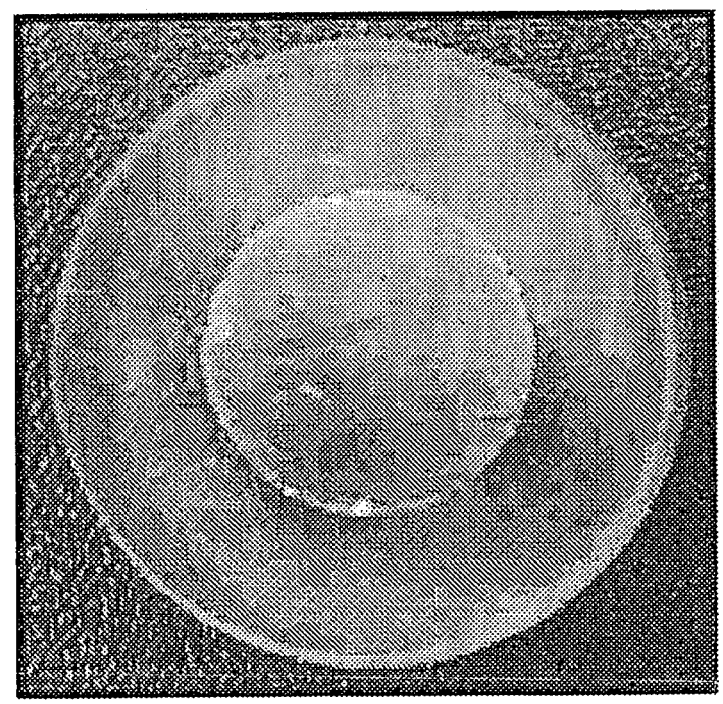
Figure 3C:
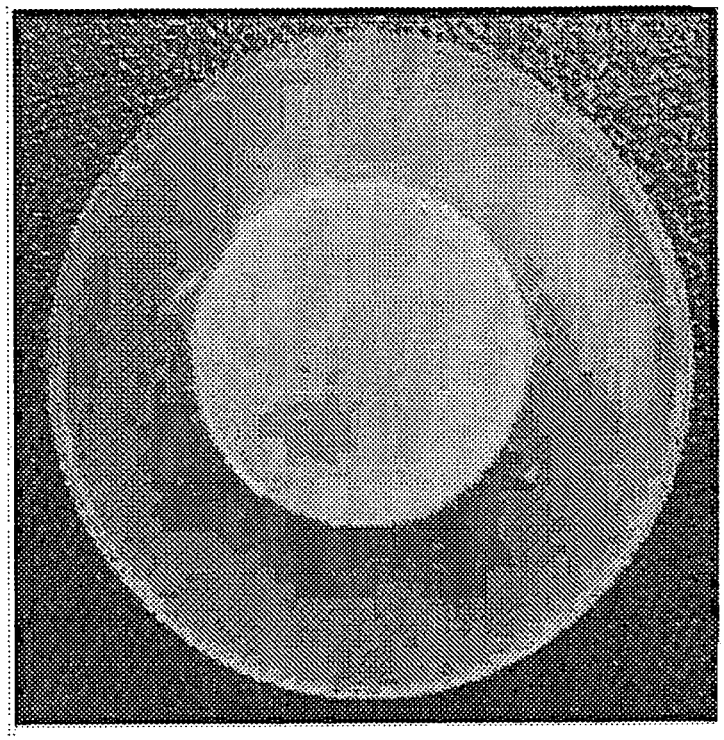
Figure 4A:
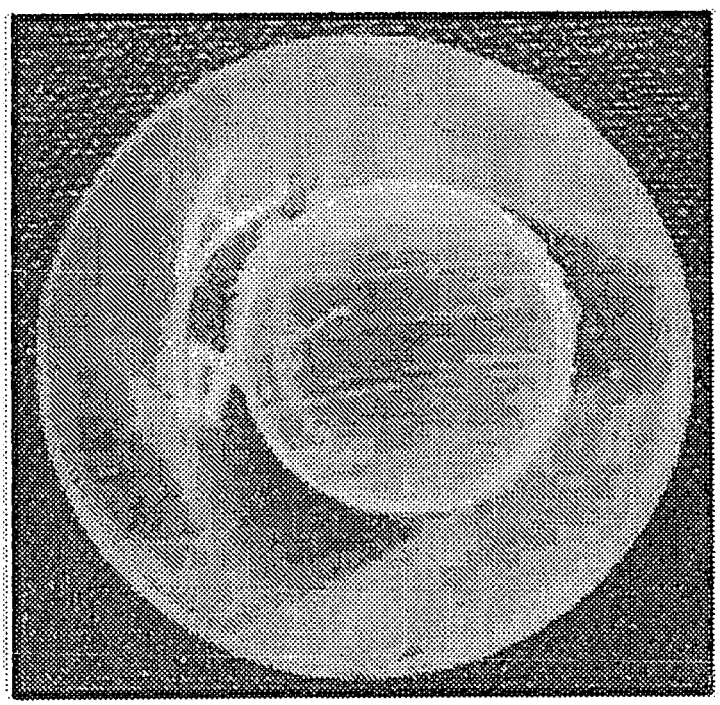
FIG. 4A, FIG. 4B, FIG. 4C, and FIG. 4D are photo images of the test results of Example 5, Example 6, Example 7, and Example 8, respectively.
Figure 4B:
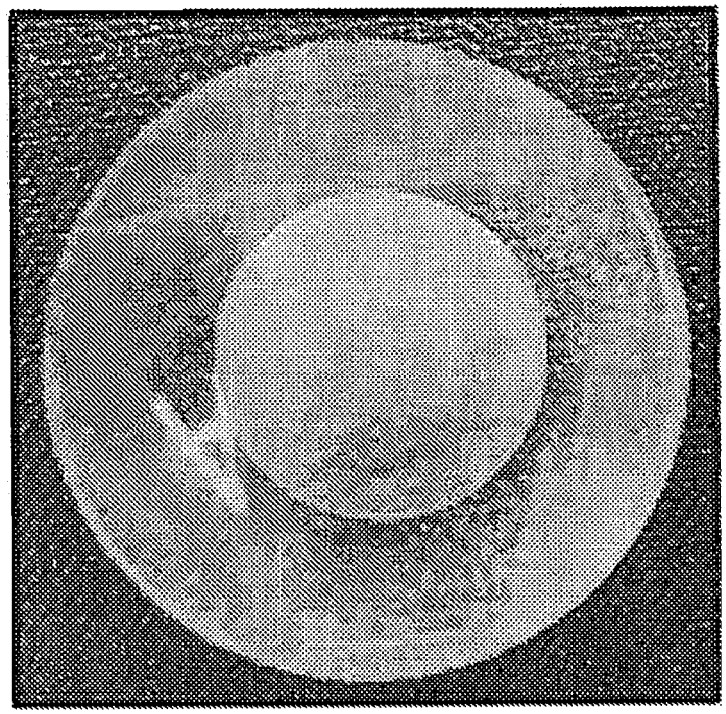
Figure 4C:
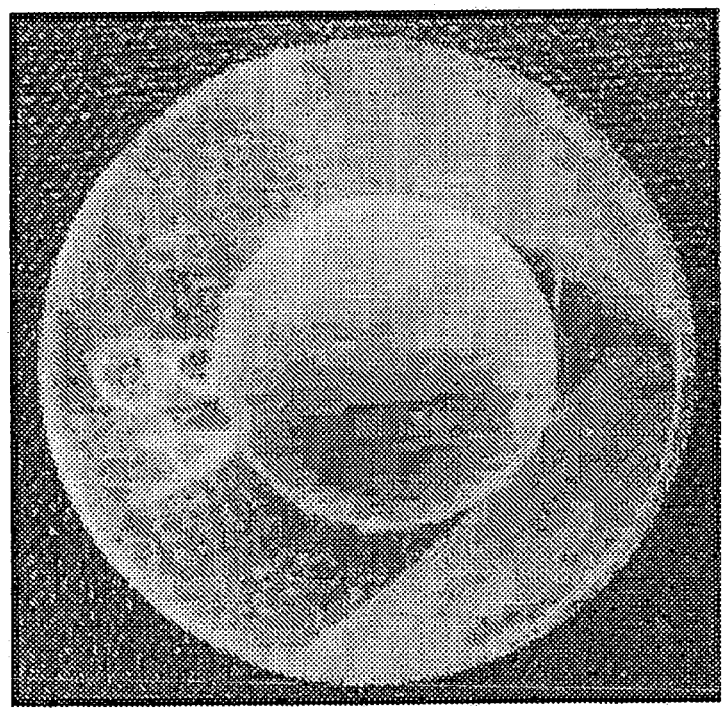
Figure 4D:
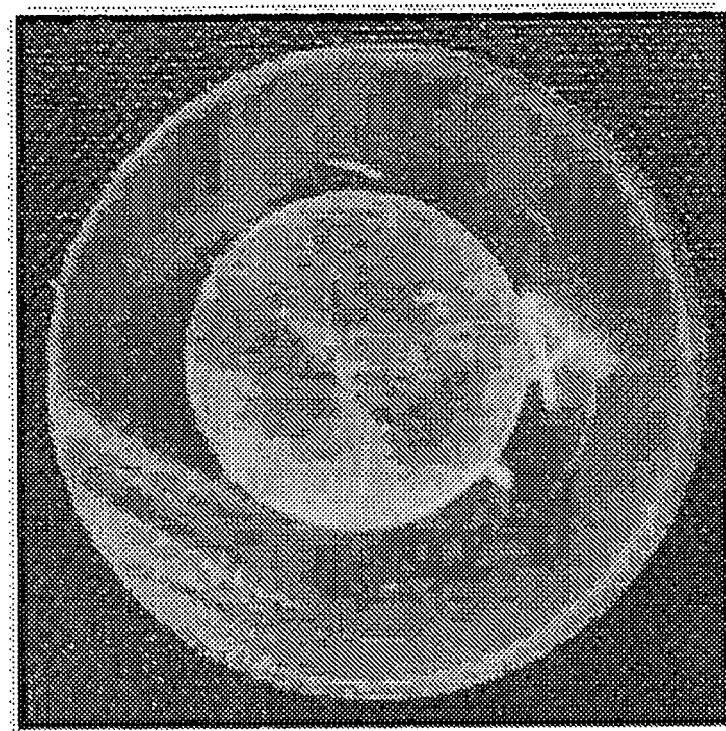

In the corrosive hydrogen atmosphere, Example 1, which included no Mo and 4.17 parts by weight W per 100 parts by weight of Cr, Ni, and Fe, had the highest corrosion resistance. Photographs of the test results for Example 1, Example 2, Example 3, and Example 4 are shown in FIG. 2A, FIG. 2B, FIG. 2C, and FIG. 2D, respectively. Photographs of the test results for Comparative Example 1, Comparative Example 2, and Comparative Example 3 are shown in FIG. 3A, FIG. 3B, and FIG. 3C, respectively.

In Example 1, Example 2, Example 3 and Example 4, the corners of the substrates were partly corroded, but overall corrosion was minimal. On the other hand, in Comparative Example 1, Comparative Example 2, and Comparative Example 3, portions of the substrates were separated due to corrosion, and the corners and/or side portions of the substrates were seriously corroded.

Metal substrates with the compositions shown in Table 2 were tested for corrosion resistance under an oxygen atmosphere. The metal substrates were purged using air in an 85% fume phosphoric acid atmosphere, and left for 5 days at 130° C. The degree of corrosion was determined by visual observation, and the metal substrates were ranked from 1, having the least corrosion, to 7, having the most corrosion. Test results are shown in Table 2.

TABLE 2

| | Cr (wt %) | Ni (wt %) | Mo (wt %) | W (wt %) | Fe (wt %) | Degree of Corrosion |
|---|---|---|---|---|---|---|
| Example 5 | 18 | 12 | 3 | 2 | 65 | 2 |
| Example 6 | 18 | 12 | 2 | 4 | 64 | 1 |
| Example 7 | 18 | 12 | 0 | 4 | 66 | 3 |
| Example 8 | 18 | 12 | 0 | 8 | 62 | 4 |
| Comparative Example 4 | 18 | 12 | 4 | 0 | 66 | 5 |
| Comparative Example 5 | 18 | 12 | 2 | 0 | 68 | 6 |
| Comparative Example 6 | 18 | 12 | 0 | 0 | 70 | 7 |

Figure 5A:
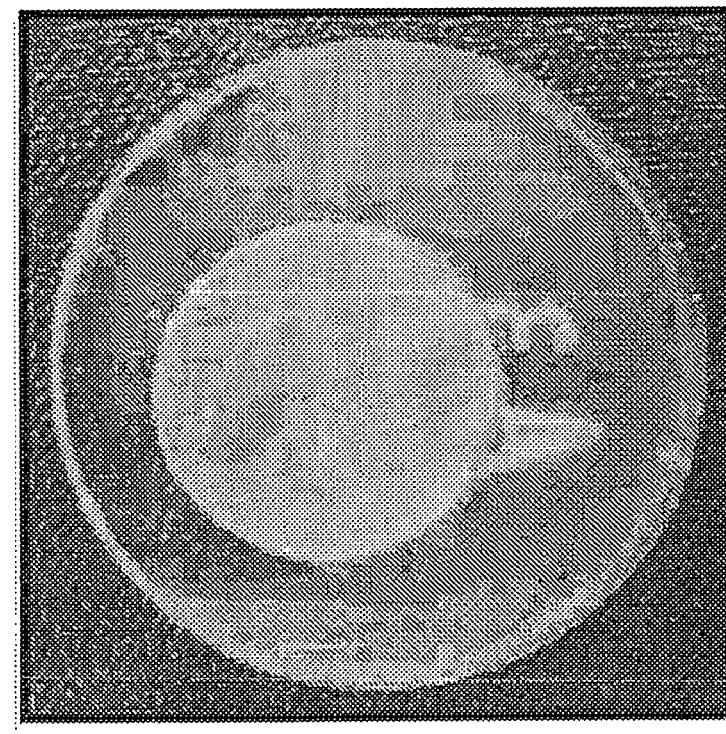
FIG. 5A, FIG. 5B, and FIG. 5C are photo images of the test results of Comparative Example 4, Comparative Example 5, and Comparative Example 6, respectively.
Figure 5B:
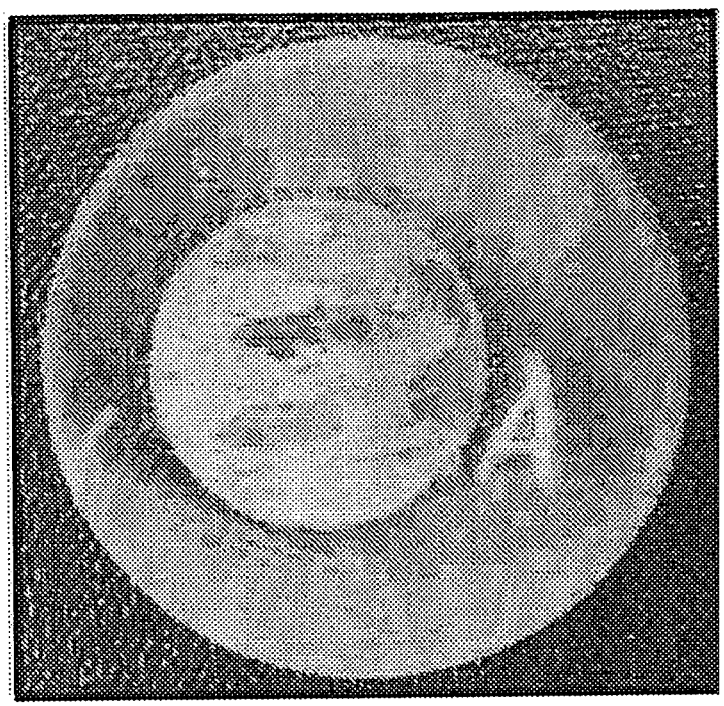
Figure 5C:
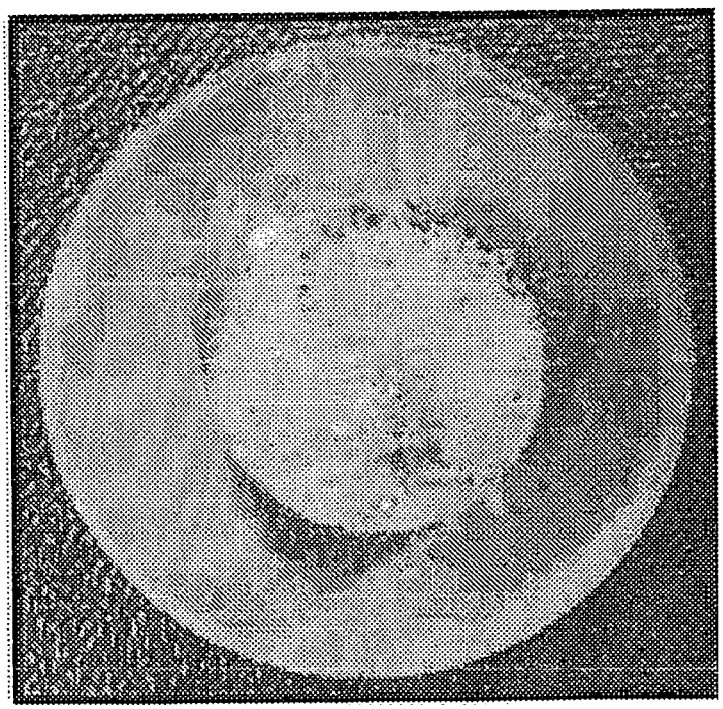

In the corrosive oxygen atmosphere, Example 6, which included 2.13 parts by weight of Mo per 100 parts by weight of Cr, Ni, and Fe and 4.26 parts by weight of W per 100 parts by weight of Cr, Ni, and Fe had the highest corrosion resistance. Photographs of the test results for Example 5, Example 6, Example 7, and Example 8 are shown in FIG. 4A, FIG. 4B, FIG. 4C, and FIG. 4D, respectively. Photographs of the test results for Comparative Example 4, Comparative Example 5, and Comparative Example 6 are shown in FIG. 5A, FIG. 5B, and FIG. 5C, respectively.

In Example 5, Example 6, Example 7, and Example 8, the corners of samples were partly corroded, but overall corrosion was minimal. On the other hand, in Comparative Example 4, Comparative Example 5, and Comparative Example 6, the sides and upper surfaces of the substrates were seriously corroded.

Metal substrates with the compositions shown in Table 3 were tested for corrosion resistance under the acidic conditions of a hydrogen atmosphere and under a neutral atmosphere. The tests were performed in the same manner as above. The acidic condition of the hydrogen atmosphere was prepared using a 1N HCl solution. The neutral condition was prepared using a 1N NaCl solution. The temperature for both conditions was maintained at 60° C.

TABLE 3

| | Cr (wt %) | Ni (wt %) | Mo (wt %) | W (wt %) | Fe (wt %) |
|---|---|---|---|---|---|
| Alloy A | 18 | 12 | 0 | 0 | 70 |
| Alloy D | 18 | 12 | 0 | 4 | 66 |

Alloy D and alloy A had similar corrosion resistances under neutral conditions. On the other hand, Alloy D had a much higher corrosion resistance than alloy A under the acidic conditions of the hydrogen atmosphere. The results of testing on alloy A and alloy D are illustrated in FIG. 1.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A separator for a fuel cell, comprising:
a first layer forming a first side of the separator, wherein the first layer comprises stainless steel consisting of Cr, Ni, Fe, and W; and
a second layer forming a second side of the separator, wherein the second layer comprises stainless steel and W,
wherein the first layer contains more W than the second layer,
wherein the first layer comprises about 0.01 to about 15 parts by weight of W per 100 parts by weight of the stainless steel, and
wherein the second layer comprises about 0.01 to about 6 parts by weight of W per 100 parts by weight of the stainless steel.

2. The separator of claim 1,
wherein the stainless steel comprises,
about 13 to about 30 parts by weight of Cr per 100 parts by weight of the stainless steel,
about 5 to about 30 parts by weight of Ni per 100 parts by weight of the stainless steel, and
about 40 to about 80 parts by weight of Fe per 100 parts by weight of the stainless steel.

3. The separator of claim 1,
wherein the first layer comprises about 1 to about 9 parts by weight of W per 100 parts by weight of the stainless steel, and
wherein second layer comprises about 0.5 to about 4.5 parts by weight of W per 100 parts by weight of the stainless steel.

4. The separator of claim 1,
wherein the second layer further comprises Mo.

5. The separator of claim 4,
wherein the second layer comprises about 0.2 to about 5 parts by weight of Mo per 100 parts by weight of the stainless steel.

6. The separator of claim 5,
wherein the second layer comprises about 1 to about 4 parts by weight of Mo per 100 parts by weight of the stainless steel.

7. The separator of claim 1,
wherein electrical conductivity of the separator is greater than about 10 S/cm, and the current density of the separator due to corrosion is less than about 16 µA/cm2.

8. The separator of claim 1,
wherein a thickness of any one of the first layer and the second layer ranges from about 0.01 to about 99.99% of the total thickness of the separator.

9. A fuel cell, comprising:
a separator, comprising,
a first layer forming a first side of the separator, wherein the first layer comprises stainless steel consisting of Cr, Ni, Fe, and W; and
a second layer forming a second side of the separator, wherein the second layer comprises stainless steel and W,
wherein the first layer contains more W than the second layer,
wherein the first layer comprises about 0.01 to about 15 parts by weight of W per 100 parts by weight of the stainless steel, and
wherein the second layer comprises about 0.01 to about 6 parts by weight of W per 100 parts by weight of the stainless steel.

10. The fuel cell of claim 9,
wherein the stainless steel comprises,
about 13 to about 30 parts by weight of Cr per 100 parts by weight of the stainless steel,
about 5 to about 30 parts by weight of Ni per 100 parts by weight of the stainless steel, and
about 40 to about 80 parts by weight of Fe per 100 parts by weight of the stainless steel.

11. The fuel cell of claim 9,
wherein the first layer comprises about 1 to about 9 parts by weight of W per 100 parts by weight of the stainless steel, and
wherein second layer comprises about 0.5 to about 4.5 parts by weight of W per 100 parts by weight of the stainless steel.

12. The fuel cell of claim 9,
wherein the second layer further comprises Mo.

13. The fuel cell of claim 12,
wherein the second layer comprises about 0.2 to about 5 parts by weight of Mo 100 parts by weight of the stainless steel.

14. The fuel cell of claim 13,
wherein the second layer comprises about 1 to about 4 parts by weight of Mo per 100 parts by weight of the stainless steel.

15. The fuel cell of claim 9,
wherein electrical conductivity of the separator is greater than about 10 S/cm, and the current density of the separator due to corrosion is less than about 16 μA/cm2.

16. The fuel cell of claim 9,
wherein a thickness of any one of the first layer and the second layer ranges from about 0.01 to about 99.99% of the total thickness of the separator.

17. The fuel cell of claim 9,
wherein the first side of the separator faces an anode, and
wherein the second side of the separator faces a cathode.

18. The separator of claim 1,
wherein a thickness of the second layer ranges from 1 μm to 10 μm.

* * * * *